(12) United States Patent
Hallum et al.

(10) Patent No.: US 10,492,461 B2
(45) Date of Patent: Dec. 3, 2019

(54) CAGE SYSTEM COMPRISING A CLIMATE CONTROL UNIT HAVING A LOW FLOW VAPORIZER

(71) Applicant: SCANBUR A/S, Karlslunde (DK)

(72) Inventors: Carsten Hallum, Hvidovre (DK); Bo Salling, Lille Skensved (DK)

(73) Assignee: SCANBUR A/S, Karlslunde (DK)

( * ) Notice: Subject to any disclaimer, the term of this patent is extended or adjusted under 35 U.S.C. 154(b) by 69 days.

(21) Appl. No.: 15/124,465

(22) PCT Filed: Mar. 12, 2015

(86) PCT No.: PCT/EP2015/055220
§ 371 (c)(1),
(2) Date: Sep. 8, 2016

(87) PCT Pub. No.: WO2015/136050
PCT Pub. Date: Sep. 17, 2015

(65) Prior Publication Data
US 2017/0013797 A1    Jan. 19, 2017

(30) Foreign Application Priority Data
Mar. 14, 2014   (EP) .................................. 14159960

(51) Int. Cl.
*A01K 1/00*        (2006.01)
*A01K 1/03*        (2006.01)

(52) U.S. Cl.
CPC ............ *A01K 1/0047* (2013.01); *A01K 1/031* (2013.01)

(58) Field of Classification Search
CPC .... A01K 1/0082; A01K 1/031; A01K 1/0047; F24F 6/025; F24F 6/18
(Continued)

(56) References Cited

U.S. PATENT DOCUMENTS 5,407,604 A * 4/1995 Luffman ............... B01F 3/0407
   210/94
5,855,823 A * 1/1999 MacGibbon .............. F24F 6/18
   239/136
(Continued)

FOREIGN PATENT DOCUMENTS

EP          1710516 A1    10/2006
GB          2211600 A      6/1989
(Continued)

OTHER PUBLICATIONS

International Search Report for PCT/EP2015/055220 dated Sep. 6, 2015, 3 pgs.

*Primary Examiner* — Steven B McAllister
*Assistant Examiner* — John E Bargero
(74) *Attorney, Agent, or Firm* — Harness, Dickey & Pierce, P.L.C.

(57) ABSTRACT

The invention relates to a cage system (15) for housing experimental animals which are to experience an environment different from that of a surrounding space (19). The cage system (15) comprises a climate control unit having a vaporizer (1) for generation of water into vapour. The vaporizer (1) comprises a vaporization chamber (4), and water is fed to the vaporization chamber (4) via a liquid supply tube (3). A surface tension breaking device (8) having an open structure is provided at the end (9) of the liquid supply tube (3) so that the water passes therethrough when flowing from the liquid supply tube (3) and into the vaporization chamber (4). Hereby water can be supplied to the vaporization chamber (4) without any significant formation of droplets in the vaporization chamber (4). The vaporizer (1) is used to supply a controllable and uniform flow of vapour to the cages (16) so that a desired humidity can be maintained.

18 Claims, 5 Drawing Sheets

(58) Field of Classification Search
USPC .......................................................... 237/58
See application file for complete search history.

(56) References Cited

U.S. PATENT DOCUMENTS

| | | | |
|---|---|---|---|
| 6,766,651 | B2 | 7/2004 | Dillenback |
| 2002/0078704 | A1 | 6/2002 | Stich |
| 2006/0151624 | A1* | 7/2006 | Grundler ............ A61M 13/003 |
| | | | 237/67 |
| 2006/0185612 | A1 | 8/2006 | Bonner et al. |
| 2007/0256643 | A1* | 11/2007 | Coiro ..................... A01K 1/031 |
| | | | 119/457 |
| 2012/0085291 | A1* | 4/2012 | Conger ................ A01K 1/0047 |
| | | | 119/419 |
| 2013/0284169 | A1* | 10/2013 | Foote ................ A61M 16/1075 |
| | | | 128/203.14 |

FOREIGN PATENT DOCUMENTS

| | | |
|---|---|---|
| JP | 07-293953 | 11/1995 |
| JP | H07-208178 | 11/1995 |
| JP | 2003180183 A | 7/2003 |
| JP | 2013000010 A | 1/2013 |
| WO | 03/095902 A1 | 11/2003 |
| WO | WO-2007/149528 A2 | 12/2007 |

* cited by examiner

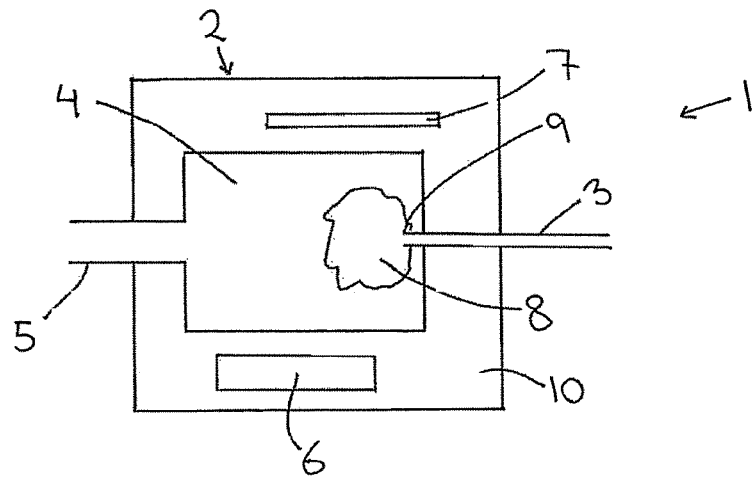
Fig. 1
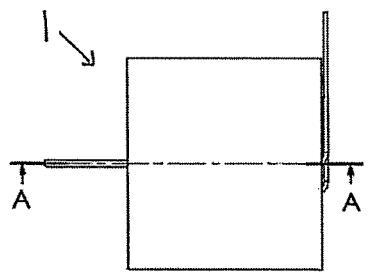
Fig. 2.b
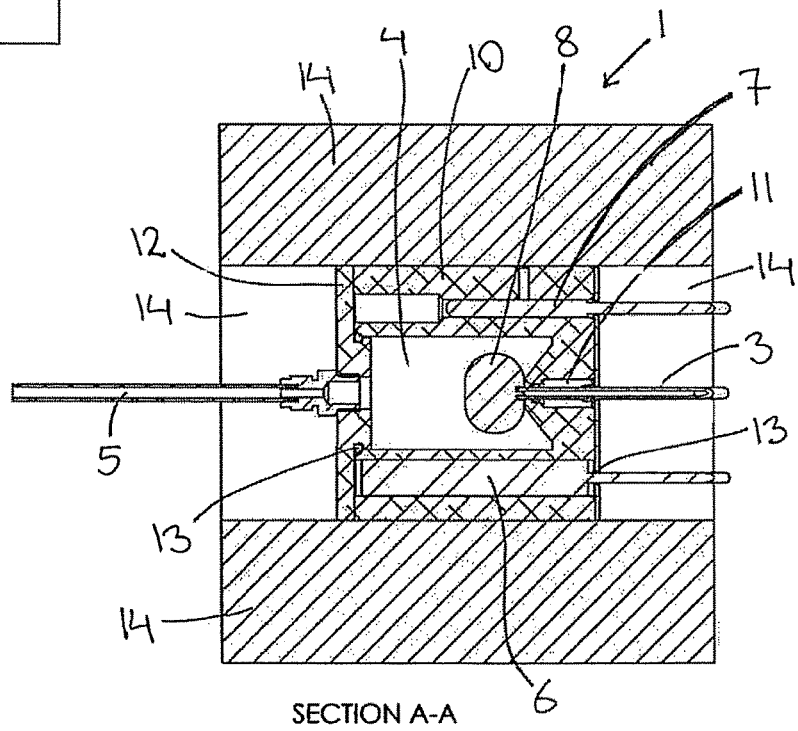
SECTION A-A
Fig. 2.a

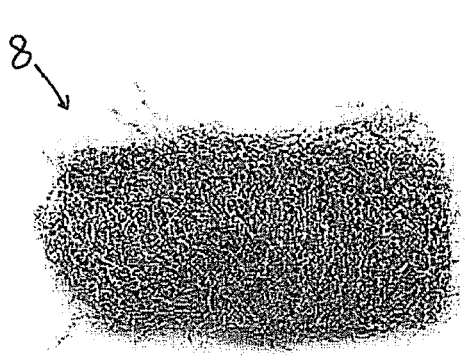
Fig. 3.a
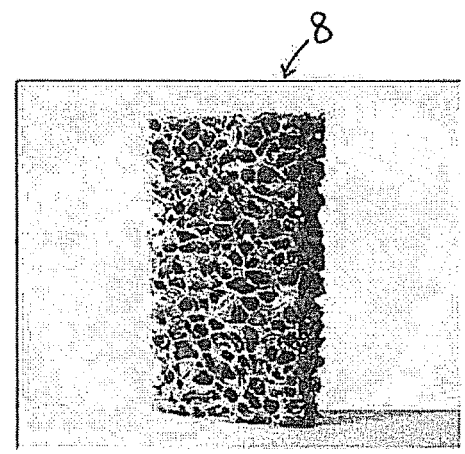
Fig. 3.b
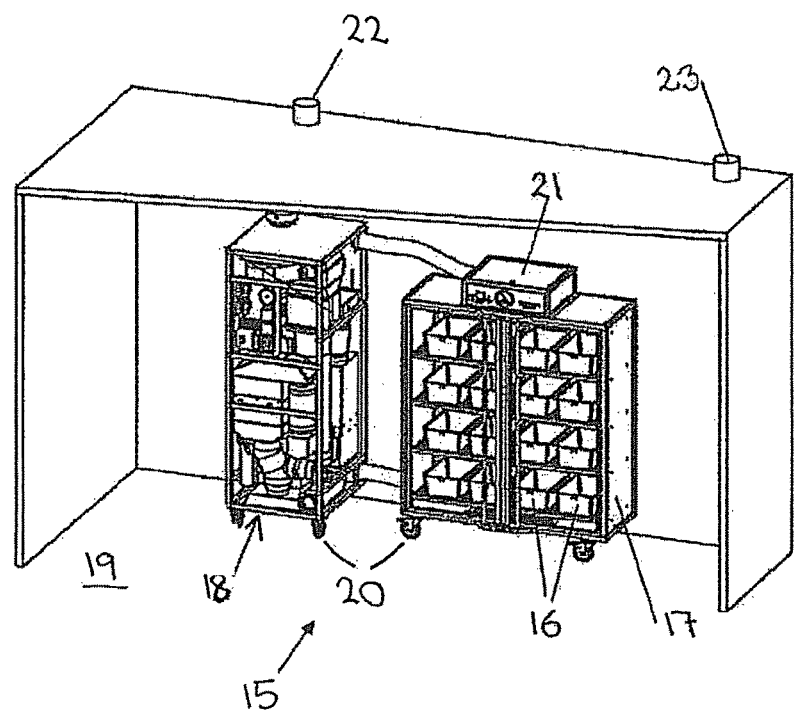
Fig. 4

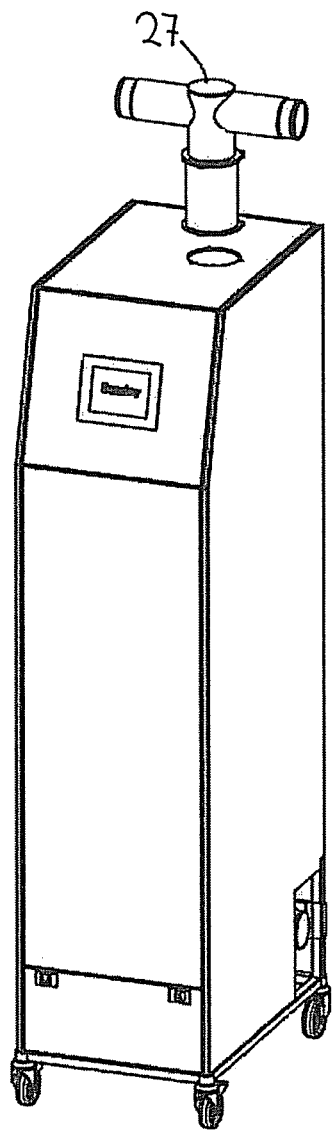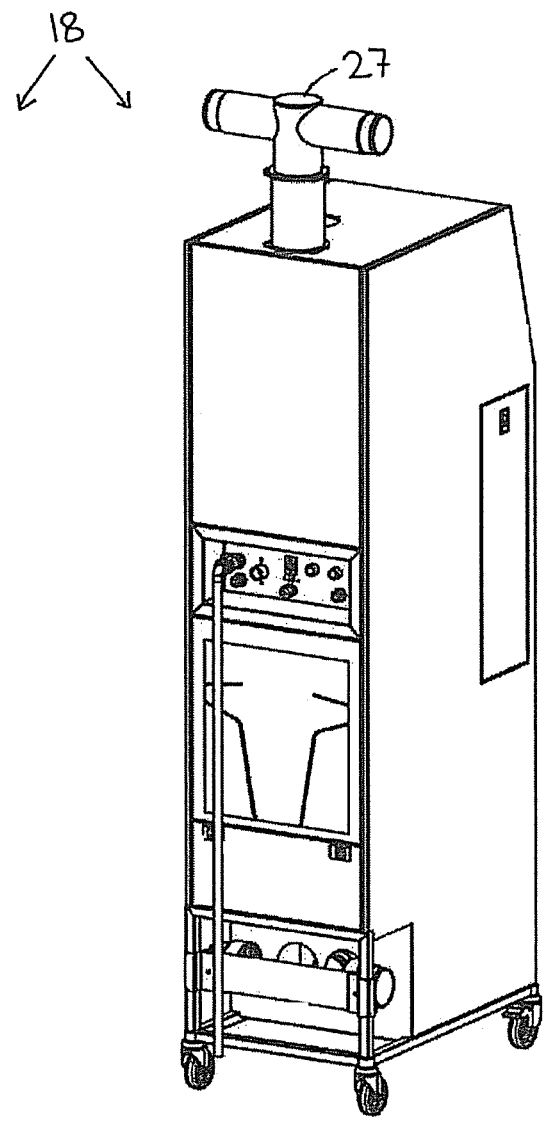
Fig. 5.a  Fig. 5.b

CAGE SYSTEM COMPRISING A CLIMATE CONTROL UNIT HAVING A LOW FLOW VAPORIZER

CROSS-REFERENCE TO RELATED APPLICATIONS

This application is a National Stage of International Application No. PCT/EP2015/055220, filed Mar. 12, 2015 and published as WO 2015/136050 on Sep. 17, 2015. This application claims the benefit of and priority to European Patent Application 141599605, filed Mar. 14, 2014. The entire disclosures of the above applications are incorporated herein by reference.

FIELD OF THE INVENTION

The present invention relates to cage systems, such as for experimental animals, comprising a climate control unit having a vaporizer, and in particular to cage systems having a vaporizer with which it is possible to generate a controllable, uniform flow of vapour at ambient pressure and in small quantities. The present invention further relates to a method of using such cage systems for housing experimental animals.

BACKGROUND OF THE INVENTION

Countries around the world have introduced specific limits relating to climate parameters in cages for experimental animals. Typically, it is specified that the animals must be kept in air with relatively narrow tolerances on temperature, relative humidity etc. In the following description, the wording "climate parameters" covers those variables which may influence the climate and the well-being of the animals. Examples of such climate parameters are: temperature, humidity, relative humidity, degree of contamination or content of a polluting element in the air, draught etc. Furthermore, the wording "fixed climate limits" will be used for those limits of the climate parameters which must be obtained to ensure a desired comfort for the animals and reliability of the experiments.

Traditionally, the fixed climate limits are meet by controlling the climate in that area of a building in which the cages are arranged. The climate is, in other words, controlled for a relatively large volume of space, namely an entire building or at least a section of a building in which the cage or cages constitutes only a fraction of the volume. Typically, the climate of the building in question is controlled in a relatively simple manner by use of regular climate control equipment of the kind which can change the temperature in a room of a building, e.g. a regular air-conditioning system. A disadvantage of the traditional way of controlling climate parameters is that an externally generated disturbance can influence the controlled climate, e.g. if a door is opened, or if external weather conditions change rapidly or become extreme whereby the climate control unit may become unable to control the climate within the desired limits.

It may further be a disadvantage if the entire number of cages must have the same climate parameters because they are in one and the same room or building. Sometimes different experiments or different animals may benefit from different climate parameters, and by the traditional method of controlling the climate, this may require the construction of additional buildings, or at least separation of a building space into smaller separate sub-spaces which are separately controllable. Such constructional reorganization of a building is time consuming, and for an extraordinary experiment which may only be carried out in a short period of time, it may imply an irrational cost.

To improve the abilities to carry out experiments on animals in a more flexible manner, and to facilitate good preconditions for the experiments as well as a suitable environment for the animals, cage systems have been developed which comprise a plurality of cages, a surrounding space outside the cages, a plurality of separate internal cage spaces enclosed in the cages, and a climate control unit which is adapted to provide a climate in the cage spaces which is different from that of the surrounding space. Such a system is e.g. disclosed in WO 2007/149528. By control of the climate locally in the cage spaces, the volume of air in the controlled climate can be reduced which may improve the ability to obtain a desired climate in the cage spaces and potentially save energy, because the space in which the climate is to be controlled is limited to where that climate is actually needed, such as where the animals live.

A climate parameter which is often desirable to control in a cage system for experimental animals is the humidity. In many regions around the world, the surrounding air humidity is relatively high, and the main issue in relation to humidity regulation is to lower the humidity in the cages. However, in other regions the humidity varies significantly around the year, and in order to be able to perform controlled experiments, it is therefore desirable to be able to add moisture, typically in the form of steam, to the air in the cages in order to keep the humidity constant. Often used humidifiers are based on piezo-transducers or ultrasound transducers. However, such a humidifier has the disadvantage that the working principle is to generate and eject water droplets into a space of air from where the evaporation takes place; therefore relatively large space is needed. This has not been a problem for air-conditioning systems where the environment is controlled for a whole room or building, but it is disadvantageous for cage systems as described above where it is necessary to control much smaller air volumes, so that the necessary amount of space is not available. Furthermore, systems based on these principle take up relative large space and are therefore typically placed above the ceiling in a room. This is not normally a problem, as traditional air-conditioning systems are part of the permanent installation in a building. However, they are thus not very flexible if a specific laboratory set-up is to be used for a shorter period only. In that case the building-up and removal of a whole system including the air-conditioning may constitute an undesired high proportion of the total cost.

Another possibility would be to use a humidifier based on addition of steam generated under pressure so that precise opening and closing of a valve can be used to add steam. However, such systems require strict safety conditions to ensure safe working environments and are difficult to regulate at very low steam levels. They are also not very flexible with respect to mutual rearrangement of the units of which the systems are made up.

OBJECT OF THE INVENTION

It is an object of the present invention to provide a cage system comprising a vaporizer which can produce a controllable and uniform amount of vapour even in small amounts.

It is a further object of the present invention to provide a cage system comprising a vaporizer which can produce a uniform flow of vapour at ambient pressure.

It is a further object of the invention to provide a cage system comprising a vaporizer with which formation of droplets of liquid in the vaporization chamber can be avoided. Thereby a more reliable control of the generated amount of vapour can be obtained so that a more precise control of the humidity in a cage of the cage system can be obtained.

It is a further object of the present invention to provide an alternative to the prior art.

In particular, it may be seen as an object of the present invention to provide a cage system comprising a vaporizer that solves the above mentioned problems of the prior art.

SUMMARY OF THE INVENTION

Thus, the above described object and several other objects are intended to be obtained in a first aspect of the invention by providing a cage system comprising:
- at least one cage which is suitable for housing one or more experimental animals,
- at least one cage space each comprising the air enclosed in at least one cage,
- a surrounding space outside the at least one cage space, and
- a climate control unit which is adapted to provide a climate in the at least one cage space which is different from that of the surrounding space,
- an air inlet for flow of air into the cage system, and
- an air outlet for flow of air out of the cage system, wherein the climate control unit comprises a vaporizer for generation of a flow of vapour to be fed into a stream of gas, the vaporizer comprising:
- a boiler unit for increasing the temperature of a liquid to above its boiling point, the boiler unit comprising:
  - a vaporization chamber wherein the vapour is generated, and
  - a heating element for raising the temperature of the vaporization chamber,
- a liquid supply tube for supplying liquid to be generated to vapour into the vaporization chamber, and
- a vapour outlet tube for leading the generated vapour out of the vaporization chamber towards the stream of gas to which it is to be added, in which vaporizer a surface tension breaking device having an open structure is provided at an end of the liquid supply tube which end is abutting or protruding into the vaporization chamber so that the liquid passes through the surface tension breaking device when flowing from the liquid supply tube and into the vaporization chamber, and in which vaporizer the surface tension breaking device has a surface area which is significantly larger than a cross section of an opening in the liquid supply tube at a region where the liquid enters into the vaporization chamber, so that liquid can be supplied to the vaporization chamber without any significant formation of droplets in the vaporization chamber, in which climate control unit the liquid is water being generated into steam and the gas is atmospheric air in an at least partly enclosed space, the climate control unit further comprising:
- a control system adapted to control the climate control unit,
- a liquid supply for the vaporizer, and
- a controllable pump adapted to supply a controlled amount of liquid from the liquid supply through the liquid supply tube, the amount being determined by the control system, wherein the control system is adapted to control at least one of the following parameters: the amount and flow rate of liquid being supplied to the vaporization chamber, and the temperature of the vaporization chamber or vaporiser body, and wherein the control is based on measured and/or predetermined values of at least one of the following parameters: the current temperature of the vaporizer body, and the current humidity of the air into which the vaporized water is to be fed.

Vapour is a substance in the gas phase at a temperature lower than its critical point, i.e. at a temperature where the same substance can exist in the liquid or solid state. For example water has a critical temperature of 374° C.

By "open structure" is meant that the liquid can pass there through. This should preferably take place without any significant hindrance of the flow of liquid, while at the same time the pores or openings through which the liquid flows should be so small that no significant formation of droplets takes place. The specific sizes of the openings making this possible depends on the actual materials used, including the liquid and the surface tension thereof.

An embodiment which is considered to be covered by the present invention is that the liquid supply tube continues into a funnel-shaped part extending into the vaporization chamber, the funnel-shaped part being made from or coated with a material which breaks or lowers the surface tension of the liquid to such an extent that droplet formation is prevented when the liquid passes through the surface tension breaking device when flowing from the liquid supply tube and into the vaporization chamber. This may e.g. result from an inner surface of the funnel-shaped part having a nano-structure with this effect for a given liquid.

In general the surface tension of a liquid could also be altered by addition of appropriate chemicals. However, this should be avoided for cage systems for experimental animals as such chemicals could be harmful to the animals or influence the experiments.

An effect of the prevention of droplet formation is that the flow of liquid can be controlled and stable even for low amounts of liquid. Examples of the importance of such a precise control will be given below.

Both the liquid supply tube and the vapour outlet tube are preferably insulated to prevent vapour generation in the liquid supply tube and droplet formation due to condensation in the vapour outlet tube. Hereby a high precision of a constant and controllable flow of vapour is ensured.

In a presently preferred embodiment, the boiler unit of the vaporizer may further comprise a sensor for measuring a temperature of at least one location within the boiler unit. Hereby the control and monitoring of the temperature can be facilitated.

A part of the surface tension breaking device of the vaporizer may extend into the liquid supply tube to break the surface tension of the liquid exiting the liquid supply tube so that formation of droplets is prevented. Hereby the risk of formation of droplets can be further lowered resulting in a better stability of the flow of liquid even at very low amounts.

In some embodiments of the invention, the surface tension breaking device of the vaporizer is in the form of at least one entangled bundle of strands of filaments, such as in the form of stainless steel wool. Such a material, also known as wire wool or wire sponge, is made from very fine soft steel filaments. It is used for a number of applications, including as an abrasive in finishing and repair work, cleaning household cookware, and sanding surfaces. In the work that led to the present invention, it was surprisingly realised that it could also be used in combination with a vaporizer under development to prevent formation of droplets in a vaporization chamber.

Alternatively, the surface tension breaking device of the vaporizer may be in the form of a porous or cellular material having an inner structure which allows passage of the liquid from the liquid supply tube and into the vaporization chamber without the formation of droplets of liquids. The material from which the porous or cellular material is made may be selected from polymer, metal, ceramic, or a combination or composite thereof.

In principle it would also be possible to use a surface tension breaking device comprising one or more entangled bundles of strands of filaments as well as a porous or cellular material.

It should preferably be ensured that there is no disadvantageous reaction between the material from which the surface tension breaking device is made and the liquid; i.e. water to be generated into steam. The actual dimensions of both the surface tension breaking device itself as well as the size and geometrical arrangement of the filaments, pores or cells as well as the spatial arrangement thereof depend on a number of parameters including the liquid and the flow rate. An optimal, or at least satisfactory, design may be determined by experiments, possibly assisted by computer simulations.

In some embodiments of the invention, the vaporizer is adapted to be used for vaporization of liquid being supplied to the vaporization chamber in amounts between 0.05 and 50 g/min, such as 0.05 to 10 g/min or 10 to 50 g/min, preferably between 0.06 and 35 g/min. Experiments made in relation to the present invention has shown that it is possible to ensure a stable and controllable flow of liquid and resulting vapour even in these small amounts which is not possible with other vaporizers used within the field of climate control of cage systems for experimental animals. An advantage of the possibility to generate a precisely controllable and stable flow of vapour makes the vaporizer particularly suitable for applications where relatively small amounts of vapour is necessary. This will be explained in further details below.

The water and/or the steam may be non-pressurized which preferably means having the same pressure as the surroundings. Some other systems known within the field work by use of pressurized vapour in combination with precisely controllable valves to control the flow of vapour to be added to an air flow. However, such pressurized systems typically require strict safety regulations to be met which can be avoided with a non-pressurized system.

In a cage system according to the present invention, the volume flow rate in the air stream may be between 1 and 600 $m^3$/hour, such as between 10 and 250 $m^3$/hour.

A cage system according to the invention may further comprise other components, such as filters, cooling units, heaters water purifiers etc. An example of a possible design of such a system will be given in the detailed description. The cage system may also further comprise means for adding smells and/or pheromones to the air stream. This may e.g. be relevant for some experiments being designed to study how the experimental animals react to such stimulation.

In preferred embodiments, the cage system comprises a plurality of cages each housing one or more experimental animals, such as mice or rats. The system is typically used in laboratories and the cages are typically arranged in racks. The system may be used to control the climate in all the cages to be identical so that there may be only one cage space comprising all the cages.

In other embodiments, the climate can be controlled individually in each cage space, and each cage space may comprise one or more cages. Another possible use of the cage system is for control of the climate during transportation of animals between different locations. Even though the preferred use is for a cage system comprising a plurality of cages, the scope of protection is also intended to cover a system having one cage only.

A vaporizer as comprised in a cage system for experimental animals as described above is particularly suitable for applications where relatively small amounts of vapour is necessary. This makes it possible to design relatively small systems where the vapour generation can be included in a mobile unit. This results in a higher flexibility with respect to the arrangement and re-arrangement of experimental systems than what is available with known systems where a part of the equipment is placed e.g. above the ceiling due to bulky installations.

The control system of the cage system may be adapted to base the control on the temperature in the at least one cage and on the temperature and/or humidity of air exiting the at least one cage space via the air outlet.

In such a cage system the control system may be adapted to control climate parameters in the at least one cage space independent on the climate of the surrounding space based on a set of selected climate limits, wherein one of the climate parameters being controlled is the humidity based on a desired level of relative humidity in the air in the at least one cage space.

The control system may be programmable to provide the climate in the at least one cage space based on a fixed limit for the climate and/or based on a desired limit for the climate.

In a second aspect the invention relates to a method of protecting at least one experimental animal against a surrounding environment, the method comprising housing the at least one experimental animal in the at least one cage in a cage system as described above, the method further comprising using the climate control unit to provide a climate in the at least one cage space which is controllable and can be different from that of the surrounding space.

The first and second aspects of the present invention may each be combined. These and other aspects of the invention will be apparent from and elucidated with reference to the embodiments described hereinafter.

BRIEF DESCRIPTION OF THE FIGURES

The cage system according to the invention as well as a climate control system and a vaporizer as comprised therein will now be described in more detail with regard to the accompanying figures. The figures show one way of implementing the present invention and is not to be construed as being limiting to other possible embodiments falling within the scope of the attached claim set.

FIG. 1 shows schematically the overall design of a vaporizer comprised in a cage system according to the present invention.

FIG. 2.*a* is a cross sectional view of an embodiment of a vaporizer of the invention; FIG. 2.*b* is a top view of the same embodiment at a smaller scale.

FIG. 3 shows schematically possible embodiments of a surface tension breaking device comprised in a vaporizer.

FIG. 4 shows schematically an overall design of a cage system for experimental animals and comprising a climate control unit for controlling the climate in the cages.

FIGS. 5.a and 5.b show schematically perspective front and rear views, respectively, of a climate control unit with the cover plates in place.

DETAILED DESCRIPTION OF AN EMBODIMENT

Figure 6:
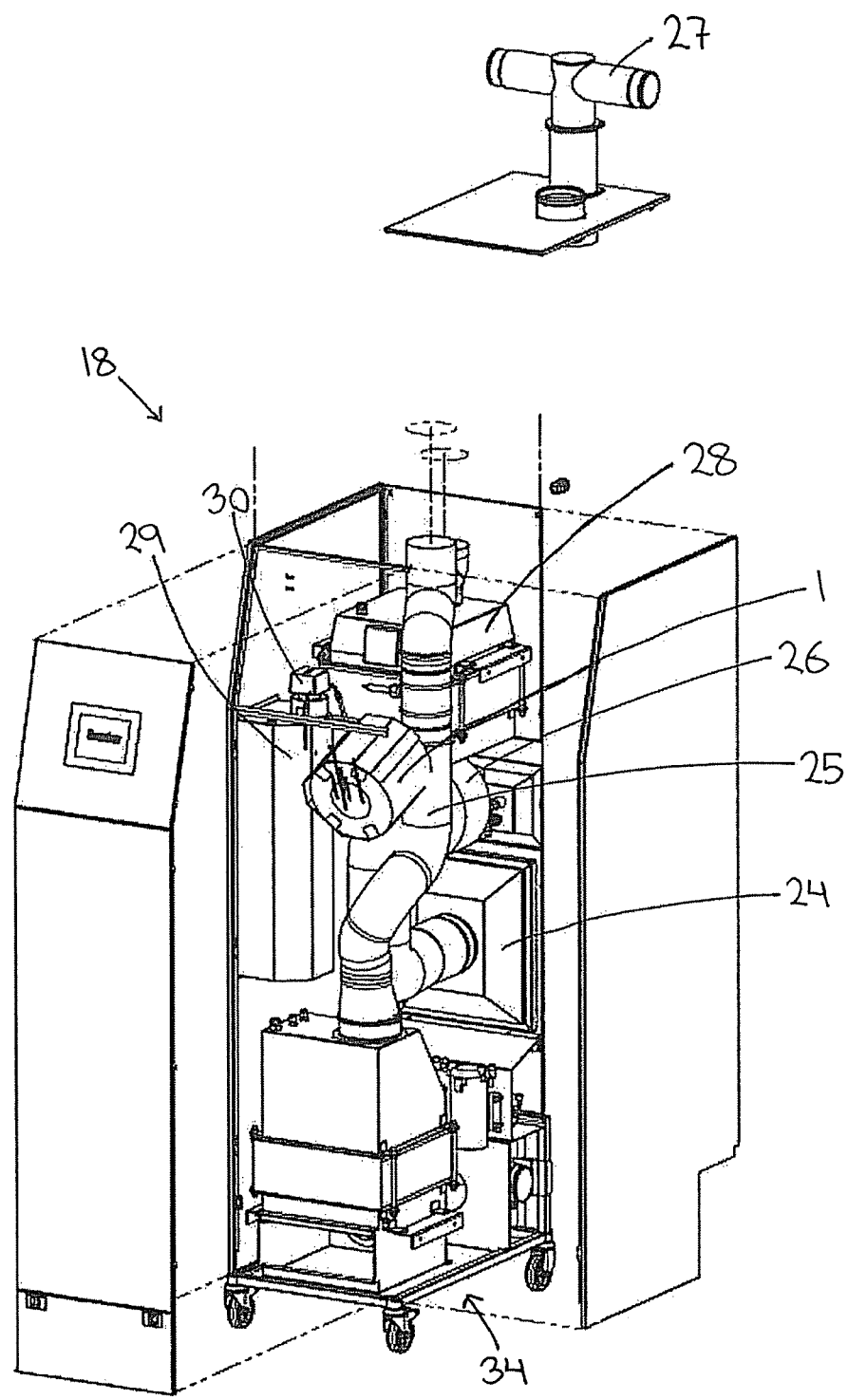
FIG. 6 shows schematically the climate control unit in FIG. 5.a with exploded view of the removed cover plates.

FIG. 1 shows schematically a vaporizer 1 for generation of a flow of vapour to be fed into a stream of gas. In relation to the present invention, the vaporizer is used to generate water into steam. The vaporizer 1 comprises a boiler unit 2 for increasing the temperature of a liquid to above its boiling point, a liquid supply tube 3 for supplying liquid to be generated to vapour into the vaporization chamber 4, and a vapour outlet tube 5 for leading the generated vapour out of the vaporization chamber towards the stream of gas to which it is to be added. The outlet tube 5 may be heated to prevent or delay any condensation of the steam inside the outlet tube 5. The boiler unit 2 comprises a vaporization chamber 4 wherein the vapour is generated, a heating element 6 for raising the temperature of the vaporization chamber 4, and a sensor 7 for measuring a temperature of at least one location within the boiler unit 2. If considered appropriate, more than one sensor and/or more than one heating element may be used in the system. This may e.g. be relevant for large systems, or in order to ensure a very precise control of the system.

A surface tension breaking device 8 having an open structure is provided at an end 9 of the liquid supply tube 3 which is abutting or protruding into the vaporization chamber 4. This arrangement means that the liquid passes through the surface tension breaking device 8 when flowing from the liquid supply tube 3 and into the vaporization chamber 4. The surface tension breaking device 8 has a surface area which is significantly larger than a cross section of an opening in the liquid supply tube 3 at a region where the liquid enters into the vaporization chamber 4. These characteristics of the surface tension breaking device 8 enables that liquid can be supplied to the vaporization chamber 4 without any significant formation of droplets in the vaporization chamber 4. Possible designs of a surface tension breaking device 8 are given below.

FIG. 2.a is a cross sectional view of an exemplary embodiment of a vaporizer of the invention in which steam is generated on demand by controlling the flow of water to the vaporization chamber 4 via a liquid supply tube 3. FIG. 2.b shows a top view of the embodiment in FIG. 2.a with A-A indicating the line along which the section shown in FIG. 2.a is taken. FIG. 2.a is shown at another scale than FIG. 2.b. The water to be supplied may be taken directly from a water tap, or it may be passed through filters and cleaning devices (see FIGS. 6 and 7), e.g. to ensure that no viruses, dissolved substances or dirt enter the cage system in which the vaporizer 1 is used. Where the liquid supply tube 3 enters through the heated mass, also referred to as the vaporizer body 10, of the boiler unit 2, the liquid supply tube 3 is protected by insulation and has a low heat conductivity, e.g. by use of an insulated Teflon tube 11. Such insulation protects the liquid supply tube 3 from the high temperatures in the vaporization chamber 4 and thereby prevents steam bubbles to form in the liquid supply tube 3 and eliminates the irregular eruptions which may otherwise occur. This is particularly relevant for small amounts of liquid as less heat energy would be necessary to heat small amounts to a temperature where steam generation would take place.

Where the liquid supply tube 3 protrudes into the vaporization chamber 4, water surface tension typically causes droplets to form in a system not comprising a surface tension breaking device 8, especially at low flow rates. Such droplets would make it hard to ensure a uniform flow of vapour. To avoid this without the use of chemicals, a surface tension breaking device 8 is provided at the end 9 of the liquid supply tube 3 protruding into the vaporization chamber 4 as described above. Such a surface tension breaking device 8 may e.g. be stainless steel wool with some of the fibres protruding into the liquid supply tube 3 in order to break the surface tension to prevent formation of droplets and obtain a uniform flow while allowing sufficient flow of water also at the maximum steam level needed.

In the embodiment shown in FIG. 2, the end of the liquid supply tube 3 is surrounded by the surface tension breaking device 8. In other embodiments (not shown) the end of the liquid supply tube 3 just has contact to the surface tension breaking device 8. Which option is chosen might depend on the type of liquid used as well as the actual dimensions. Which specific design to use for a given application may be determined by experiments, possibly aided by computer simulations.

In a working unit inserted as a part of a cage system 15 as described below, water enters through a valve into an expansion vessel (not shown) to have water available at a controlled low pressure. From there the water flow is typically adjusted by a stepper motor controlled peristaltic pump 30 (see FIGS. 6 and 7). Water from the pump 30 enters the vaporization chamber 4 via the liquid supply tube 3 and leaves as steam into the air stream which is to be fed to the cage space. The boiler unit 2 is surrounded by thermal insulation 14, preferably in all directions. In the embodiment shown in FIG. 2, a thermal sensor 7 and a heating element 6 are built into the vaporizer body 10 containing the vaporization chamber 4. It will also be possible to arrange a plurality of thermal sensors 7 and/or heating elements 6 in or adjacent to the vaporizer body 10. Such sensors 7 and heating elements 6 would be well-known to a skilled person within this technical field. In the illustrated embodiment, an end part of the vaporization chamber 4 is established by a lid 12 comprising a central hole in which the vapour outlet tube 5 is arranged. Various gaskets 13 are arranged at joining points between the different elements to ensure control of the flow of vapour.

FIG. 3 shows schematically different possible designs of the surface tension breaking device 8 for use in a vaporizer 1 according to the present invention. FIG. 3.a shows an embodiment in which the surface tension breaking device 8 is in the form of at least one entangled bundle of strands of filaments, such as in the form of stainless steel wool. FIG. 3.b shows another embodiment in which the surface tension breaking device is in the form of a porous or cellular material having an inner structure which allows passage of the liquid from the liquid supply tube 3 and into the vaporization chamber 4 without the formation of droplets of liquids. The material from which the porous or cellular material is made is selected from polymer, metal, ceramic, or a combination or composite thereof.

For some environments and for some types of experiments, it is desirable to be able to control the climate in the cage spaces very precisely. Especially a precise control of the humidity is not always possible with the presently available systems as described in the section "Background of the invention". A schematic design of a cage system 15 comprising a vaporizer 1 as described above is shown in FIG. 4. A plurality of cages 16 each adapted to house experimental animals are arranged in a rack 17, and the climate in the cages 16 is controlled by a climate control unit 18 arranged next to the rack 17. The climate control unit 18 provides to the cages 16 air which is adjusted to meet specific conditions required for the animals or experiments in question. From the climate control unit 18, the air can be led to the cages 16 by use of hoses or tubes of a kind regularly known from ventilation systems for building ventilation.

The cage system 15 comprises at least one cage space each comprising the air enclosed in at least one cage 16. These cage spaces may be arranged so that there is an intermediate space in which air can flow freely or in a controlled manner. This intermediate space comprising a plurality of cage spaces may e.g. be the inner space in one rack 17. Alternatively, each cage 16 comprises an enclosure so that there is none or only a limited flow of air between the individual cages 16. In the embodiment shown in FIG. 4, the air in the whole rack is a cage space. However, in other embodiments, the cages are ventilated individually so that the air within the rack around the cages is not ventilated. The rack 17 with the cages 16 is placed in a surrounding space 19 outside the cages 16. The cage system 15 further comprises a climate control unit 18 which is adapted to provide a climate in the cage spaces which is different from that of the surrounding space 19.

In a cage system according to the invention, water is generated into steam which is led into the atmospheric air in the at least partly enclosed space in the cages 16. In the embodiment shown in FIG. 4, there is only one inlet of air into the rack 17, but it will also be possible to have more climate control units 18 per rack 17, in order to obtain a higher degree of flexibility with respect to the experiments that can be performed. A still further embodiment is to have more racks connected to one climate control unit. The rack 17 and the climate control unit 18 are both illustrated as mobile units provided with rollers 20 by which they can easily be moved to another location. The rack 17 comprises a climate control feedback station 21 which controls the climate and optionally logs any deviation of climate parameters from a desired set point or range. In the embodiment in FIG. 4, the climate control feedback station 21 is shown as a separate unit, but it may also be included in the climate control unit 18. The surrounding space 19 may have a climate which is controlled by an external control system (not shown) connected via the inlet 22 and outlet 23. Even though the external control system operates independent on the climate control unit 18, the two systems may communicate climate parameters, and they may share sensors, e.g. for sensing an outside temperature etc.

Figure 7:
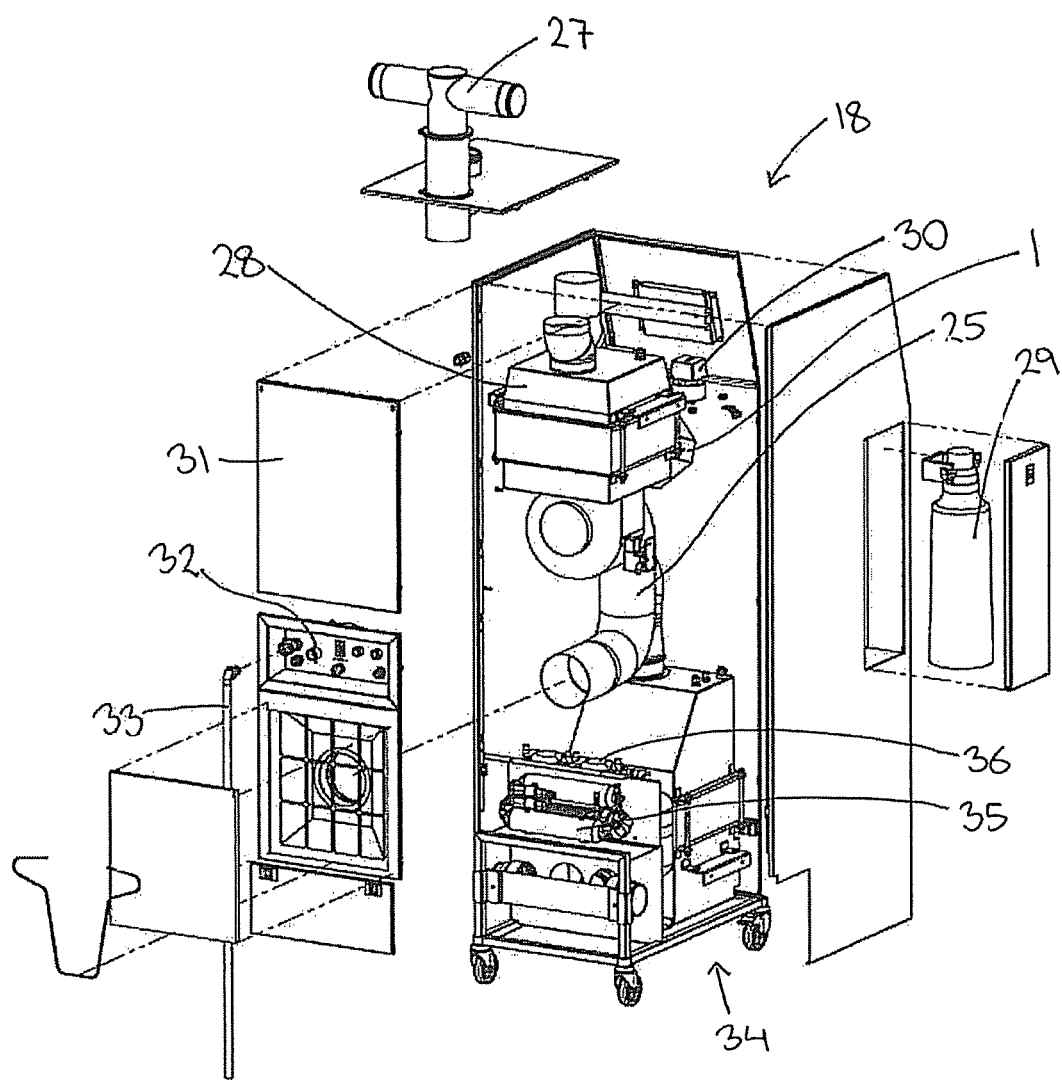
FIG. 7 shows schematically the climate control unit in FIG. 5.b with exploded view of the partly removed cover plates.

An example of another design of a climate control unit 18 comprised in a cage system according to the present invention is shown in FIGS. 5.*a* and 5.*b* which show schematically perspective front and rear views, respectively, of the climate control unit 18 with the cover plates in place. FIG. 6 shows schematically the climate control unit in FIG. 5.*a* with exploded view of the removed cover plates, and FIG. 7 shows schematically the climate control unit in FIG. 5.*b* with exploded view of the partly removed cover plates.

In addition to the illustrated parts, the climate control unit typically comprises a 2-way valve to control cooling coil set point, a touch screen user interface and PLC controller, a waste water pump for condensated water, one-way valves for water inlet and waste water circuit, and sensors for sensing temperature, humidity and air-pressure.

Air enters into the climate control unit 18 via an air intake 24 from the room including a pre-filter. From here it is led via a hose connection 25 in which the steam is generated by a vaporizer 1 as described above to obtain a desired humidity. The system shown in FIGS. 6 and 7 further comprises a fan 26 for supply of air to the ventilated cages 16 which are typically arranged in a rack 17 as shown in FIG. 4. Before entering the cage spaces via the air supply connection point 27, it is preferably led through a HEPA filter 28 to ensure that the air is as clean as desired, possibly sterile. The climate control system in FIGS. 6 and 7 has a connection point which can supply ventilated air towards two racks. FIGS. 6 and 7 also show a water filter 29 and a peristaltic pump 30 for the water being supplied to the vaporizer 1. A rear panel 31 of the system is shown to comprise a connection 32 for the water supply as well as a waste water connection 33. If desired, the system may also comprise one or more mufflers (not shown). The purpose of the mufflers is to increase the comfort for the animals and/or for those people working with the animals.

Air returning from the connected cages 16 enters the return air connection, passes through a return air HEPA filter which again removes all particles according to the chosen filter class. The returned air thereafter passes through an extract fan unit which controls the return air volume and raises the air pressure to obtain the set pressure regime. This part 34 of the cage system relating to the air returning from the cages 16 is shown at the lower part of the cage system in FIGS. 6 and 7. It will be known to a person skilled in the art how to design the part of the system handling the return air. The system in the figures also comprises a reverse osmosis filter assembly 35 and a booster pump 36 for this filter to remove dissolved substances from the water.

Each climate limits to be controlled by the climate control unit may specify a range of a climate parameter, a maximum value of a climate parameter, or a minimum value of a climate parameter, such as temperature, humidity, draught etc. The climate limit may also specify a rate by which a climate parameter is changed, e.g. how fast the temperature or humidity is changed. The climate limit may also be time dependent, e.g. so that the temperature or humidity is changed over the day or at least changed between day and night which may simulate the natural environment for various rodents and other typical experimental animals.

Each cage 16 is typically equipped with one or more sensors to provide information relating to the climate in each cage space individually. At least one climate sensor may also be arranged in a duct which feeds controlled air to the cage spaces, and sensors may optionally also be provided in the surrounding space 19 and/or in a space outside the building in which the cage system 15 is installed. This may facilitate control actions to be initiated before the climate parameters come outside the ranges by acting on changes in the climate outside the cage spaces.

Temperature and humidity are measured at the air entrance, and temperature and relative humidity are measured in the air exit. The goal is to maintain a set relative humidity level at the air temperature that enters the vaporizer 1. In a tested embodiment of the invention, the temperature of the vaporizer body 10 is measured and controlled by a PLC to maintain a vaporizer body temperature of 120° C. increasing to 135° C. at maximum vaporization level. The volume flow rate in the air stream being led to the cages 16 is typically between 1 and 600 m³/hour, such as between 10 and 250 m³/hour.

The climate control unit 18 is adapted to control at least one of the following parameters: the amount and flow rate of liquid being supplied to the vaporization chamber 4, the temperature of the vaporization chamber 4 or the vaporizer body 10. The control is based on measured and/or predetermined values of at least one of the following parameters: the current temperature of the boiler unit, the current humidity of the air into which the vaporized water is to be fed. The control system is adapted to base the control on the temperature in the plurality of cages 16 and on the temperature and/or humidity of air exiting the cages via the air outlet.

To enable more or less adaptation of the climate in the surrounding space 19 and thus to save energy in the climate control, the climate control unit may be programmable to provide the climate in the cage spaces based on a fixed limit for the climate and based on a desired limit for the climate, where the fixed limit could relate to an absolute value of a temperature or humidity etc. which may not be exceeded, and the desired limit may be a temperature or humidity etc. which is optimal for a specific animal or experiment. The climate control unit 18 may then be adapted to evaluate the costs related to changing the climate versus the distance of the climate from the two limits, and based thereon, it may be adapted to select either to change the climate in accordance with the desired limit or adapt the climate to the surrounding space 19 until the fixed limit is reached. The climate control unit 18 may also be adapted to change the climate with a specific time-step so that the animal is slowly habituated. As an example, the climate control unit may be programmable with respect to a desired and fixed limit for the change in temperature or humidity per time unit.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A cage system comprising:
   at least one cage which is suitable for housing one or more experimental animals;
   at least one cage space each comprising the air enclosed in at least one cage;
   a surrounding space outside the at least one cage space;
   a climate control unit which is adapted to provide a climate in the at least one cage space which is different from that of the surrounding space;
   an air inlet for flow of air into the cage system; and
   an air outlet for flow of air out of the cage system,
   wherein the climate control unit comprises a vaporizer for generation of a flow of vapor to be fed into a stream of gas, the vaporizer comprising:
   a boiler unit for increasing the temperature of a liquid to above its boiling point, the boiler unit comprising:
      a vaporization chamber wherein the vapor is generated,
      a heating element for raising the temperature of the vaporization chamber, and
      a vaporizer body that surrounds the vaporization chamber, wherein the heating element is contained within a mass of the vaporizer body or is disposed adjacent to the vaporizer body;
   a liquid supply tube for supplying liquid to be generated to vapor into the vaporization chamber;
   a vapor outlet tube for leading the generated vapor out of the vaporization chamber towards the stream of gas to which it is to be added; and
   a surface tension breaking device having an open structure provided at a terminating end of the liquid supply tube which is abutting or protruding into the vaporization chamber so that the liquid passes through the surface tension breaking device when flowing from the liquid supply tube and into the vaporization chamber, wherein the surface tension breaking device has a surface area which is significantly larger than a cross section of an opening in the liquid supply tube at a region where the liquid enters into the vaporization chamber, so that liquid can be supplied to the vaporization chamber without any significant formation of droplets in the vaporization chamber,
   wherein in the climate control unit the liquid is water being generated into steam and the gas is atmospheric air in an at least partly enclosed space, the climate control unit further comprising:
   a control system adapted to control the climate control unit;
   a liquid supply for the vaporizer; and
   a controllable pump adapted to supply a controlled amount of liquid from the liquid supply through the liquid supply tube, the amount being determined by the control system,
   wherein the control system is adapted to control at least one of the following parameters: the amount and flow rate of liquid being supplied to the vaporization chamber and the temperature of the vaporization chamber or the vaporizer body that surrounds the vaporization chamber, and
   wherein the control is based on measured and/or predetermined values of at least one of the following parameters: the current temperature of the vaporizer body, and the current humidity of the air into which the vaporized water is to be fed.

2. The cage system according to claim 1, wherein the boiler unit of the vaporizer further comprises a sensor for measuring a temperature of at least one location within the boiler unit.

3. The cage system according to claim 1, wherein a part of the surface tension breaking device of the vaporizer extends into the liquid supply tube to break the surface tension of the liquid exiting the liquid supply tube so that formation of droplets is prevented.

4. The cage system according to claim 1, wherein the surface tension breaking device of the vaporizer is in the form of at least one entangled bundle of strands of filaments.

5. The cage system according to claim 1, wherein the surface tension breaking device of the vaporizer is in the form of a porous or cellular material having an inner structure which allows passage of the liquid from the liquid supply tube and into the vaporization chamber without the formation of droplets of liquids.

6. The cage system according to claim 5, wherein the material from which the porous or cellular material is made is selected from polymer, metal, ceramic, or a combination or composite thereof.

7. The cage system according to claim 1, wherein the vaporizer is adapted to be used for vaporization of liquid being supplied to the vaporization chamber in amounts between 0.05 g/min and 50 g/min.

8. The cage system according to claim 1, wherein the water and the steam are non-pressurized.

9. The cage system according to claim 1, wherein the volume flow rate in the air stream is between 1 m³/hour and 600 m³/hour.

10. The cage system according to claim 1, wherein the control system is adapted to base the control on the temperature in the at least one cage and on at least one of the temperature and humidity of air exiting the at least one cage space via the air outlet.

11. The cage system according to claim 1, wherein the control system is adapted to control climate parameters in the at least one cage space independent on the climate of the surrounding space based on a set of selected climate limits, wherein one of the climate parameters being controlled is the humidity based on a desired level of relative humidity in the air in the at least one cage space.

12. The cage system according to claim 1, wherein the control system is programmable to provide the climate in the at least one cage space based on a fixed limit for the climate and based on a desired limit for the climate.

13. The method of protecting at least one experimental animal against a surrounding environment, the method comprising housing the at least one experimental animal in the at least one cage in a cage system according to claim 1, the method further comprising using the climate control unit to provide a climate in the at least one cage space which is controllable and can be different from that of the surrounding space.

14. The cage system according to claim 4, wherein the surface tension breaking device is in the form of stainless steel wool.

15. The cage system according to claim 1, wherein the vaporizer is adapted to be used for vaporization of liquid being supplied to the vaporization chamber in amounts between 0.05 g/min to 10 g/min.

16. The cage system according to claim 1, wherein the vaporizer is adapted to be used for vaporization of liquid being supplied to the vaporization chamber in amounts between 10 g/min to 50 g/min.

17. The cage system according to claim 1, wherein the vaporizer is adapted to be used for vaporization of liquid being supplied to the vaporization chamber in amounts between 0.06 g/min and 35 g/min.

18. The cage system according to claim 1, wherein the volume flow rate in the air stream is between 10 m³/hour and 250 m³/hour.

* * * * *